United States Patent [19]

Koppel

[11] 3,926,978
[45] Dec. 16, 1975

[54] PROCESS FOR PREPARING 3-FLUOROCEPHALOSPORINS
[75] Inventor: Gary A. Koppel, Indianapolis, Ind.
[73] Assignee: Eli Lilly and Company, Indianapolis, Ind.
[22] Filed: Feb. 6, 1974
[21] Appl. No.: 439,206

[52] U.S. Cl. .................. 260/243 C; 424/246
[51] Int. Cl.² ........................ C07D 501/20
[58] Field of Search .................. 260/243 C

[56] References Cited
UNITED STATES PATENTS
3,830,801  8/1974  Bywood et al. ............ 260/243 C
3,830,808  8/1974  Clark et al. ............... 260/243 C Primary Examiner—Nicholas S. Rizzo
Attorney, Agent, or Firm—William C. Martens, Jr.; Everet F. Smith

[57] ABSTRACT

An ester of a 7-acylamido-3-fluoro-3-cephem-4-carboxylic acid is prepared by reacting a 3-sulfonate ester of an ester of a 7-acylamido-3-hydroxy-3-cephem-4-carboxylic acid in an inert solvent with an inorganic fluoride in the presence of an 18-crown-6 ether and at a temperature of from about −20° C. to about +25° C.

11 Claims, No Drawings

PROCESS FOR PREPARING 3-FLUOROCEPHALOSPORINS

BACKGROUND OF THE INVENTION

This invention relates to a novel process for preparing a specific class of cephalosporin antibiotics. In particular, it relates to a process for preparing 3-fluoro cephalosporins represented by the following general formula

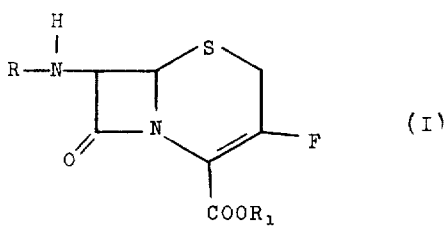

in which R is an acyl group derived from a carboxylic acid, and $R_1$ is a carboxylic acid protecting ester group.

SUMMARY OF THE INVENTION

In copending applications Ser. Nos. 335,381 and 335,414, both filed on Feb. 23, 1973, both now abandoned esters of 3-fluoro-3-cephem-4-carboxylic acids of the hereinabove structure as well as their corresponding free acids are disclosed and claimed. In a copending application Ser. No. 439,207, filed of even date herewith, a process is disclosed for converting 3-hydroxy-3-cephem-4-carboxylic acids and esters, each to its corresponding 3-alkylsulfonyloxy or 3-arylsulfonyloxy derivative. In the method disclosed in this latter copending application, a 7-acyl amido-3-hydroxy-3-cephem-4-carboxylic acid ester is reacted in an inert solvent with a lower alkyl sulfonyl halide or a phenyl or substituted phenylsulfonyl halide in the presence of a hydrogen halide acceptor to form the corresponding 3-lower alkylsulfonyloxy, 3-phenylsulfonyloxy, or substituted 3-phenylsulfonyloxy derivative of the 3-hydroxy substituent.

In accordance with the process of this invention, it has now been discovered that the aforementioned sulfonyloxy derivative can be converted to its corresponding 3-fluoro-3-cephem-4-carboxylic acid ester. Thus, under certain specified conditions hereinafter defined, it has been found that a 3-lower alkylsulfonyloxy, a 3-phenylsulfonyloxy, or a substituted 3-phenylsulfonyloxy derivative of a 3-hydroxy-3-cephem-4-carboxylic acid ester can be directly fluorinated to produce 3-fluoro compounds which are disclosed and claimed in copending applications Ser. Nos. 335,381 and 335,414. By protecting the 4-carboxy function of the cephalosporin molecule with readily removable ester groups, such groups being well known in the cephalosporin art, the resulting 3-fluoro esters can be converted to their corresponding free acids by known procedures for removing such ester groups. Correspondingly, by known cleavage techniques, the 7-acylamido substituent present on the produced 3-fluoro-3-cephem-4-carboxylic acid or ester provided herein can be cleaved to the corresponding 7-amino-3-fluoro-3-cephem-4-carboxylic acid or ester. The resulting product can then be re-acylated to provide 7-acylamido-3-fluoro-3-cephem-4-carboxylic acid antibiotics. By whatever particular course, the available 7-acylamido-3-fluoro-3-cephem-4-carboxylic acids are valuable antibiotic compounds which can be used to inhibit the growth of microorganisms which are pathogenic to animal and plant life.

It is thus an object of this invention to provide a novel process for preparing a class of cephalosporin antibiotics. In particular, it is an object of this invention to provide a process for preparing 7-acylamido-3-fluoro-3-cephem-4-carboxylic acid esters, said esters being readily convertible by known techniques to active antibiotic compounds.

Accordingly, this invention is directed to a process for preparing a compound of the formula

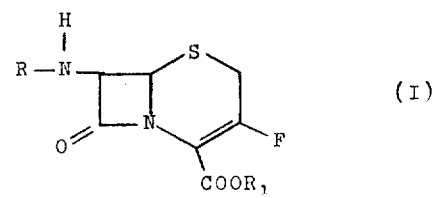

which comprises reacting a 3-sulfonate ester cephalosporin of the formula

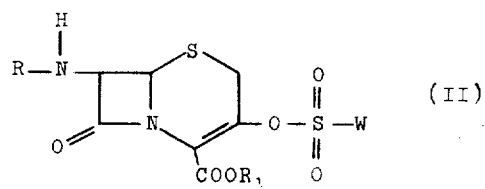

with an inorganic fluoride of the formula $M^+F^-$ in which M is potassium, sodium, or silver in the presence of an 18-crown-6-ether and an inert solvent at a temperature of from about $-20°$ C. to about $+25°$ C., in which, in the above formulae, W is $C_1-C_6$ alkyl, phenyl, tolyl, halophenyl, or nitrophenyl, R is an acyl group derived from a carboxylic acid and represented by the formula

wherein R' is $C_1-C_6$ alkyl, $C_1-C_3$ haloalkyl, $C_1-C_3$ cyanoalkyl, phenyl, methylphenyl, hydroxyphenyl, halophenyl, nitrophenyl, methoxyphenyl, or a 5-substituted-amino-5-carboxybutyl ester group of the formula

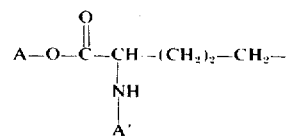

wherein A is diphenylmethyl, p-nitrobenzyl, benzyl, 2,2,2-trichloroethyl, t-butyl, or p-methoxybenzyl and A' is C₂-C₄ alkanoyl, C₂-C₄ haloalkanoyl, benzoyl, halobenzoyl, 2,4-dinitrophenyl, or phthaloyl; or R' is a group of the formula

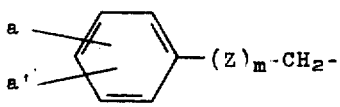

wherein
  $a$ and $a'$ independently are hydrogen, $C_1-C_4$ lower alkyl, $C_1-C_4$ lower alkoxy, halogen, hydroxy, or nitro;
  Z is O or S; and
  $m$ is O or 1;
or R' is a group of the formula

wherein
  P is 2-thienyl, 3-thienyl, or a phenyl group of the formula

wherein
  $a$ and $a'$ are as defined above,
  Q is hydroxyl, formyloxy, acetoxy, or protected amino;
or R' is a group of the formula
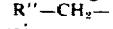
wherein
  R'' is 2-thienyl, 3-thienyl, 2-furyl, 2-oxazyl, 2-thiazyl, or 1-tetrazyl; and
  R₁ is benzyl, p-methoxybenzyl, p-nitrobenzyl, diphenylmethyl, 2,2,2-trichloroethyl, or t-butyl.

DETAILED DESCRIPTION OF THE INVENTION

As heretofore defined, the invention is directed to a process for preparing compounds represented by the general formula I in which the substituents R and R₁ have the meanings hereinbefore defined.

In the foregoing definition of the compounds produced by the process of this invention, the term "$C_1-C_6$ alkyl" refers to straight and branched chain alkyl hydrocarbon groups such as methyl, ethyl, n-propyl, iso-propyl, n-butyl, sec-butyl, n-amyl, isoamyl, n-hexyl, 2,3-dimethylbutyl, and the like. The term "$C_1-C_3$ haloalkyl" refers to such groups as chloromethyl, bromomethyl, 2-iodoethyl, 2-chloropropyl, 3-bromopropyl, and the like. The term "$C_1-C_3$ cyanoalkyl" refers to such groups as cyanomethyl, 2-cyanoethyl, 3-cyanopropyl, 2-cyanopropyl, and the like. The term "$C_2-C_4$ alkanoyl" refers to acetyl, propionyl, butyryl, and the like. The term "$C_2-C_4$ haloalkanoyl" refers to chloroacetyl, bromoacetyl, 2-chloropropionyl, 3-bromobutyryl, and the like. The term "halobenzoyl" refers to chloro and bromo substituted benzoyl groups such as 4-chlorobenzoyl, 4-bromobenzoyl, 2,4-dichlorobenzoyl, and the like. As used herein, the term "halogen" or the term "halo" refers to fluoro, chloro, bromo, or iodo. The term "$C_1-C_4$ lower alkyl" refers to the straight and branched chain lower alkyl hydrocarbon groups such as methyl, ethyl, n-propyl, iso-propyl, n-butyl, t-butyl, and the like. The term "$C_1-C_4$ lower alkoxy" refers to methoxy, ethoxy, isopropoxy, n-butoxy, and the like. The term "protected amino" refers to t-butyloxycarbonyl, benzyloxycarbonyl, p-nitrobenzyloxycarbonyl, trichloroethoxycarbonyl, enamines formed with methyl acetylacetate and acetylacetone, as well as such like groups.

The following are illustrative of groups in the above definition in which

is

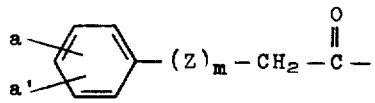

and in which $m$ is O: phenylacetyl, 4-methylphenylacetyl, 3-ethylphenylacetyl, 4-isopropylphenylacetyl, 2-methylphenylacetyl, 4-chlorophenylacetyl, 4-nitrophenylacetyl, 4-bromophenylacetyl, 2,4-dichlorophenylacetyl, 3-bromophenylacetyl, 4-fluorophenylacetyl, 2-fluorophenylacetyl, 3,4-dihydroxyphenylacetyl, 4-hydroxyphenylacetyl, 3-hydroxyphenylacetyl, 2,6-dimethoxyphenylacetyl, 3-methoxyphenylacetyl, 4-isopropoxyphenylacetyl, 3-ethoxyphenylacetyl, 4-methoxyphenylacetyl, 3,4-dimethoxyphenylacetyl, 4-t-butoxyphenylacetyl, 3-n-butoxyphenylacetyl, 3-chloro-4-methylphenylacetyl, 3-nitrophenylacetyl, and the like. When, in the above formula $m = 1$ and Z represents —O—, illustrative groups include the following: phenoxyacetyl, 4-methylphenoxyacetyl, 3-ethylphenoxyacetyl, 4-isopropylphenoxyacetyl, 2-methylphenoxyacetyl, 4-chlorophenoxyacetyl, 4-nitrophenoxyacetyl, 4-bromophenoxyacetyl, 2,4-dichlorophenoxyacetyl, 3-bromophenoxyacetyl, 4-fluorophenoxyacetyl, 2-fluorophenoxyacetyl, 3,4-dihydroxyphenoxyacetyl, 4-hydroxyphenoxyacetyl, 3-hydroxyphenoxyacetyl, 2,6-dimethoxyphenoxyacetyl, 3-ethoxyphenoxyacetyl, 4-methoxyphenoxyacetyl, 3,4-dimethoxyphenoxyacetyl, 4-t-butoxyphenoxyacetyl, 2-n-butoxyphenoxyacetyl, 3-chloro-4-methylphenoxyacetyl, 3-nitrophenoxyacetyl, 3-hydroxy-4-methylphenoxyacetyl, 2-chlorophenoxyacetyl, 4-isopropoxyphenoxyacetyl, and the like acyl groups. When, in the foregoing formula $m = 1$ and Z represents —S—, illustrative groups include the following: phenylmercaptoacetyl, 4-methylphenylmercaptoacetyl, 3-ethylphenylmercaptoacetyl, 4-isopropylphenylmercaptoacetyl, 2-methylphenylmercaptoacetyl, 4-chlorophenylmercaptoacetyl, 4-nitrophenylmercaptoacetyl, 4-bromophenylmercaptoacetyl, 2,4-dichlorophenylmercaptoacetyl, 3-bromophenylmercaptoacetyl, 4-fluorophenylmercaptoacetyl, 2-fluorophenylmercaptoacetyl, 3,4-dihydroxyphenylmercaptoacetyl, 4-hydroxyphenylmercaptoacetyl, 3-hydroxyphenylmercaptoacetyl, 2,6-dimethoxyphenylmercaptoacetyl, 3-ethoxyphenylmercaptoacetyl, 4-methoxyphenylmercaptoacetyl, 3,4-dimethoxyphenylmercaptoacetyl, 4-t-butoxyphenylmercaptoacetyl, 3-n-butoxyphenylmercaptoacetyl, 3-chloro-4-methylphenylmercaptoacetyl, 3-nitrophenylmercaptoacetyl, 3,4-dimethylphenylmercaptoacetyl, 3,4-dichlorophenylmercaptoacetyl, 2,5-dichlorophenylmercaptoacetyl, 3-fluoro-4-chlorophenylmercaptoacetyl, 3- chloro-4-fluorophenylmercaptoacetyl, 2,6-difluorophenylmercaptoacetyl, 3-fluorophenylmercaptoacetyl, and such like groups.

When, in formulae I and II, R is

and R' is a 5-substituted-amino-5-carboxybutyl group,

represents esterified amino-protected adipoyl groups in which the ester group is, for example, diphenylmethyl, p-nitrobenzyl, benzyl, p-methoxybenzyl, 2,2,2-trichloroethyl, t-butyl, and the like, and the substituted amino group is, for example, acetamido, propionamido, chloroacetamido, 3-fluorobutyramido, benzamido, 2,4-dichlorobenzamido, 4-chlorobenzamido, 4-bromobenzamido, phthalimido, 2,4-dinitroanilino, and the like.

When R' represents a group of the formula

P—CH—
|
Q illustrative acyl groups having the overall formula

include the mandeloyl group of the formula

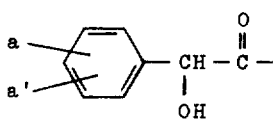

as well as the O-formyl and O-acetyl derivatives thereof represented by the general formula

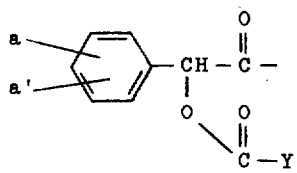

in which Y is hydrogen or methyl, the protected α-aminophenylacetyl group represented by the formula

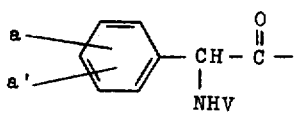

in which V is, for example, t-butyloxycarbonyl, benzyloxycarbonyl, p-nitrobenzyloxycarbonyl, trichloroethoxycarbonyl, an enamine formed from methyl acetoacetate and acetylacetone, and the like. Also included are those 2-thienylacyl and 3-thienylacyl groups in which, in the above formulae, the phenyl group is replaced by a 2-thienyl or a 3-thienyl ring.

Illustrative of the foregoing acyl groups are 4-methylmandeloyl, 4-hydroxymandeloyl, 3-hydroxymandeloyl, 4-methoxymandeloyl, 3-bromomandeloyl, mandeloyl, 4-chloromandeloyl, 3-methyl-4-fluoromandeloyl, 2-fluoromandeloyl, 4-fluoromandeloyl, 4-isopropylmandeloyl, 3,4-dimethyl-O-formylmandeloyl, 4-chloro-O-formylmandeloyl, 3-isopropoxy-O-formylmandeloyl, 3-bromo-O-formylmandeloyl, O-formylmandeloyl, 3,4-dimethoxy-O-formylmandeloyl, O-acetylmandeloyl, 4-hydroxy-O-acetylmandeloyl, α-(t-butyloxycarbonylamino)phenylacetyl, α-(benzyloxycarbonylamino)phenylacetyl, α-(p-nitrobenzyloxycarbonylamino)phenylacetyl, α-(2,2,2-trichloroethoxycarbonylamino)phenylacetyl, α-(t-butyloxycarbonylamino)-4-hydroxyphenylacetyl, α-(benzyloxycarbonylamino)-4-hydroxyphenylacetyl, α-(p-nitrobenzyloxycarbonylamino)-4-hydroxyphenylacetyl, α-(2,2,2-trichloroethoxycarbonylamino)-4-hydroxyphenylacetyl, α-(t-butyloxycarbonylamino)-3-hydroxyphenylacetyl, α-hydroxy-2-thienylacetyl, α-hydroxy-3-thienylacetyl, α-formyloxy-2-thienylacetyl, α-acetoxy-2-thienylacetyl, α-formyloxy-3-thienylacetyl, α-acetoxy-3-thienylacetyl, α-(t-butyloxycarbonylamino)-2-thienylacetyl, α-(t-butyloxycarbonylamino)-3-thienylacetyl, α-(benzyloxycarbonylamino)-2-thienylacetyl, α-(benzyloxycarbonylamino)-3-thienylacetyl, α-(p-nitrobenzyloxycarbonylamino)-2-thienylacetyl, α-(p-nitrobenzyloxycarbonylamino)-3-thienylacetyl, α-(2,2,2-trichloroethoxycarbonylamino)-2-thienylacetyl, α-(2,2,2-trichloroethoxycarbonylamino)-3-thienylacetyl, and the like.

When, in the foregoing formulae I and II,

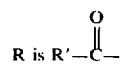

and R' represents a group of the formula R''—CH$_2$—, illustrative of the acyl groups of the formulae I and II are the following: 2-thienylacetyl, 3-thienylacetyl, 2-furylacetyl, oxazyl-2-acetyl, thiazyl-2-acetyl, and the tetrazyl-1-acetyl group represented by the following formula

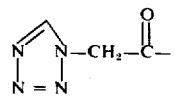

A preferred group of 3-fluorocephalosporins prepared by the process of this invention are represented by the following formula III,

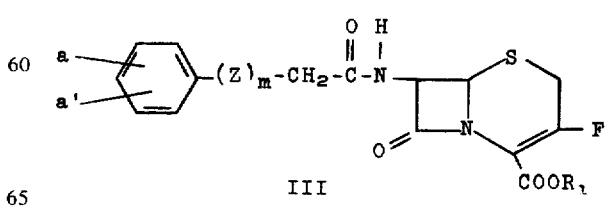

in which $R_1$, $a$, $a'$, Z and M have the same meanings as defined above. Illustrative of these preferred compounds presented in the form of their free acid are the following: 7-phenylacetamido-3-fluoro-3-cephem-4-carboxylic acid, 7-phenoxyacetamido-3-fluoro-3-cephem-4-carboxylic acid, 7-(4-hydroxyphenylacetamido)-3-3-fluoro-3-cephem-4-carboxylic acid, 7-(4-chlorophenoxyacetamido)-3-fluoro-3-cephem-4-carboxylic acid, 7-(4-methoxyphenoxyacetamido)-3-fluoro-3-cephem-4-carboxylic acid, and the like.

Another preferred group of 3-fluorocephalosporins prepared by the process of this invention are those represented by the following formula IV,

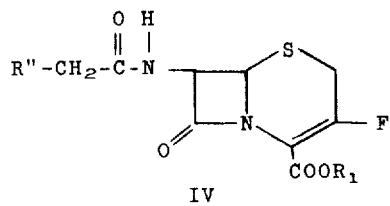

IV in which R" represents 2-thienyl, 3-thienyl, 2-furyl, and 1-tetrazyl and $R_1$ has the same meaning as defined above. Illustrative of the foregoing compounds represented by the formula IV and presented as their free acid are the following: 7-(2-thienylacetamido)-3-fluoro-3-cephem-4-carboxylic acid, 7-(2-furylacetamido)-3-fluoro-3-cephem-4-carboxylic acid, 7-(3-thienylacetamido)-3-fluoro-3-cephem-4-carboxylic acid, 7-(1-tetrazylacetamido)-3-fluoro-3-cephem-4-carboxylic acid, and the like.

A further preferred group of 3-fluorocephalosporins prepared by the process of this invention are those represented by the following formula V,

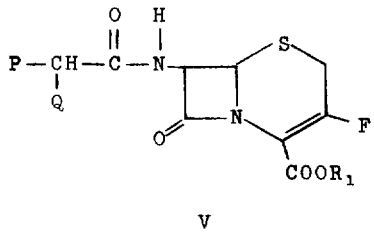

V wherein P represents phenyl or a substituted phenyl group as defined herein and Q is hydroxy, formyloxy, or protected amino. Illustrative of the foregoing compounds represented by formula V and presented as their free acid are the following: 7-D-mandelamido-3-fluoro-3-cephem-4-carboxylic acid, 7-D-(4-chloromandelamido)-3-fluoro-3-cephem-4-carboxylic acid, 7-D-(4-hydroxymandelamido)-3-fluoro-3-cephem-4-carboxylic acid, 7-D-(4-methoxymandelamido)-3-fluoro-3-cephem-4-carboxylic acid, 7-(α-formyloxyphenylacetamido)-3-fluoro-3-cephem-4-carboxylic acid, 7-[α-(t-butoxycarbonylamino)phenylacetamido]-3-fluoro-3-cephem-4-carboxylic acid, 7-[α-(benzyloxycarbonylamino)phenylacetamido]-3-fluoro-3-cephem-4-carboxylic acid, 7-[α-(2,2,2-trichloroethoxycarbonylamino)phenylacetamido]-3-fluoro-3-cephem-4-carboxylic acid, 7-[α-(p-nitrobenzyloxycarbonylamino)phenylacetamido]-3-fluoro-3-cephem-4-carboxylic acid, 7-[α-(t-butoxycarbonylamino)-4-hydroxyphenylacetamido]-3-fluoro-3-cephem-4-carboxylic acid, and the like.

$R_1$ in the foregoing formulae I and II refers to typical cephalosporin carboxy protecting groups, specifically, benzyl, p-methoxybenzyl, p-nitrobenzyl, diphenylmethyl (benzhydryl), 2,2,2-trichloroethyl, or t-butyl. Preferably, $R_1$ is p-nitrobenzyl or 2,2,2-trichloroethyl, and, most preferably, p-nitrobenzyl.

The starting materials employed in the process of this invention are prepared from the corresponding 3-hydroxy-3-cephem compounds. The 3-hydroxy-3-cephem compounds are prepared as described in copending application Ser. No. 310,191 filed Nov. 28, 1972. As described therein a 7-acylamido-3-exomethylenecepham-4-carboxylic acid ester or a 7-amino-3-exomethylenecepham-4-carboxylic acid ester is reacted with ozone in an inert solvent at a temperature between —80° and 0° C. to form the ozonide derivative of the 3-exomethylene double bond. The ozonide intermediate, which is not isolated, is decomposed by reacting the ozonide in situ with a mild reducing agent such as sodium bisulfite or, preferably, sulfur dioxide, to provide the corresponding 3-hydroxy-3-cephem-4-carboxylic acid ester.

The ozonolysis of a 7-amino-3-exomethylenecepham-4-carboxylic acid ester or a 7-acylamido-3-exomethylenecepham-4-carboxylic acid ester of the following Formula VI is carried out by passing ozone through a solution of the 3-exomethylenecepham ester in an inert solvent at a temperature between about —80° and 0° C. The exomethylene double bond reacts with ozone to form in situ an intermediate ozonide which is decomposed, as hereinafter described, to form the 3-hydroxy-3-cephem ester of the formula VII.

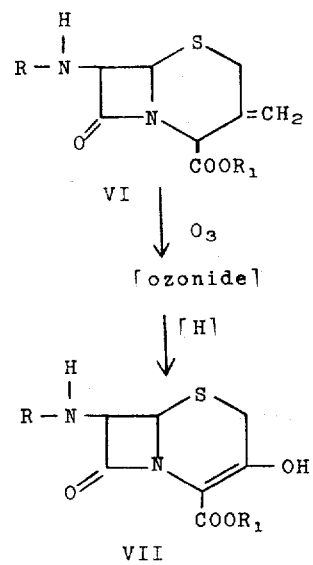

In the above formulae, R is hydrogen or an acyl group derived from a carboxylic acid and which acyl group is non-oxidizable under the described ozonolysis conditions. $R_1$ is an ester forming group and preferably one which is easily removed under hydrogenolysis, or acid or base hydrolysis conditions.

Although the 3-exomethylene cephalosporins can also undergo oxidation with ozone to form the sulfoxide, under the described ozonization conditions the exo double bond reacts preferentially with ozone to form the ozonide. The formation of the sulfoxide occurs as a result of over-oxidation. Whereas the exo double bond reacts rapidly with ozone, the reaction at the sulfur atom of the dihydrothiazine ring to form the sulfoxide occurs at a much slower rate. However, the following over-oxidation products can be formed in the ozonolysis reaction.

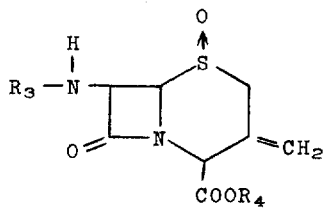

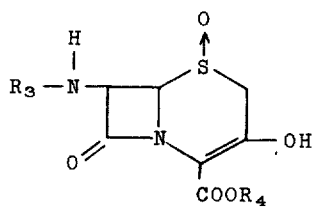

Ozone gas is prepared by means of an ozone generator of the type commonly used in synthetic and analytical chemical work to produce ozone by the action of an electric discharge on oxygen. One such ozone generator is that manufactured by the Welsback Corporation. The ozone is generated in a stream of oxygen which is then passed directly into the reaction vessel. The percentage of ozone contained in the oxygen stream can be varied as desired, for example, by varying the rate of flow of oxygen through the ozonizer as well as by varying the intensity of the electric discharge. The percentage of ozone in the oxygen stream can be determined iodometrically by titrating with sodium thiosulfate the amount of iodine liberated from a standard solution of potassium iodide by ozone from the generator. The percentage of ozone in the oxygen stream is not critical, however for convenience in carrying out the ozonolysis method of this invention an estimate of the amount of ozone flowing into the reaction mixture enables one to determine the time at which the desired reaction should be complete and thus minimizes the formation of over-oxidation products.

Alternatively, the ozonolysis reaction can be followed chromatographically. For instance, a small aliquot of the reaction mixture is withdrawn, the ozonide decomposed, and the amount of unreacted starting material and 3-hydroxy-3-cephem product present in the sample is assessed by a comparison of the thin layer chromatogram with that of a known amount of starting material and 3-hydroxy-3-cephem compound.

Inert solvents which can be used in the ozonolysis are those solvents in which the 3-exomethylene cepham esters are at least partially soluble and which are unreactive with ozone under the described conditions. Commonly used organic solvents such as methanol, ethanol, ethyl acetate, methyl acetate, and methylene chloride are satisfactory.

The concentration of the starting material in the inert solvent is not critical and it is preferred to use a solvent volume sufficient to form a complete solution.

The preferred temperature in the ozonolysis reaction is between about −80° and −50° C.

When ozonide formation is complete as determined by either method described above, any excess ozone present in the reaction mixture is purged from the mixture by bubbling nitrogen or oxygen through the mixture.

Following the removal of any excess ozone, the ozonide is decomposed by adding to the reaction mixture a mild reducing reagent selected from the group consisting of sodium bisulfite, sulfur dioxide, and trimethyl phosphite to provide the 3-hydroxy-3-cephem-4-carboxylic acid ester. The decomposition is carried out by adding an excess of the reducing reagent and then stirring the reaction mixture at a temperature of about −80° to 0° C. until the reaction mixture is negative in the potassium iodide-starch test.

A preferred reagent for decomposing the intermediate ozonide is gaseous sulfur dioxide. This reagent is preferred since it is completely volatilized from the reaction mixture during the subsequent work-up and thus does not complicate the recovery of the reaction product.

The 7-acylamido-3-hydroxy-3-cephem-4-carboxylic acid esters are recovered from the reaction mixture by first evaporating the mixture to dryness and thereafter extracting the product from the residue. Alternatively, N-acylated 3-hydroxy-3-cephem esters can be recovered from the organic liquid phase of the decomposition mixture by separating the liquid phase from insolubles, and, after washing and drying, evaporating the organic layer to yield the 3-hydroxy ester.

The 3-hydroxy nucleus ester, a 7-amino-3-hydroxy-3-cephem-4-carboxylic acid ester, is best isolated in the form of a salt as for example, the hydrochloride or hydrobromide salt.

When an ester of 7-amino-3-exomethylenecepham-4-carboxylic acid is ozonized, it is preferable to use a salt thereof, for example, the hydrochloride or p-toluenesulfonate salt.

The starting materials for the preparation of the 3-exomethylenecepham esters are prepared as described in copending application Ser. No. 118,941, filed Feb. 25, 1971. As described therein, a 7-acylamido cephalosporanic acid is reacted with a sulfur containing nucleophile according to known procedures to effect the nucleophilic displacement of the acetoxy group of the cephalosporanic acid and to provide a 7-acylamido-3-thiosubstituted-methyl-3-cephem-4-carboxylic acid. The 3-thiosubstituted cephem product is then reduced with hydrogen in the presence of Raney nickel or with zinc/formic acid in the presence of dimethylformamide to produce the 3-exomethylenecepham acid. For example, 7-phenylacetamido cephalosporanic acid is reacted with potassium ethyl xanthate to yield 7-phenylacetamido-3-ethoxythionocarbonylthiomethyl-3-cephem-4-carboxylic acid which, on reduction with zinc/formic acid in the presence of DMF, yields 7-phenylacetamido-3-exomethylenecepham-4-carboxylic acid of the formula

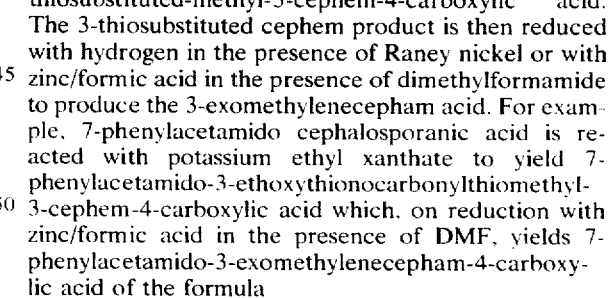

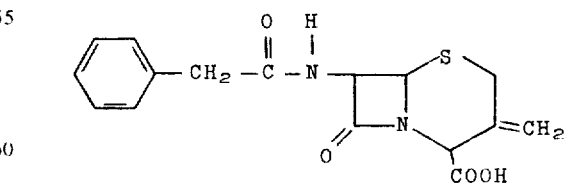

Likewise, there is described the 3-exomethylenecepham nucleus of the formula

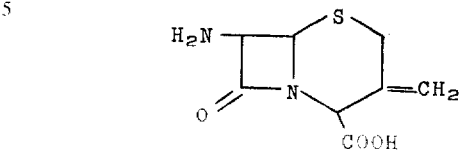

which can be prepared by reacting a 7-acylamido-3-exomethylenecepham-4-carboxylic acid ester with phosphorus pentachloride ($PCl_5$) in methylene chloride in the presence of pyridine to obtain the intermediate imino chloride. The imino chloride is reacted with methanol in the cold to afford the imino ether. The imino ether readily undergoes hydrolysis to provide the 7-amino-3-exomethylenecepham-4-carboxylic acid ester hydrochloride. The ester group is then removed to yield the 3-exomethylenecepham nucleus.

As indicated hereinabove, the starting materials of the process of this invention are prepared from the corresponding 3-hydroxy-3-cephem compounds. In this method a 7-acylamido-3-hydroxy-3-cephem-4-carboxylic acid ester is reacted in an inert solvent with a lower alkylsulfonyl halide or a phenyl or substituted phenylsulfonyl halide in the presence of a hydrogen halide acceptor to form the corresponding 3-lower alkylsulfonyloxy, 3-phenylsulfonyloxy, or substituted 3-phenylsulfonyloxy derivative of the 3-hydroxy substituent.

The preparation of the alkylsulfonate and arylsulfonate esters of the 3-hydroxy-3-cephem esters is illustrated in the following generalized reaction scheme.

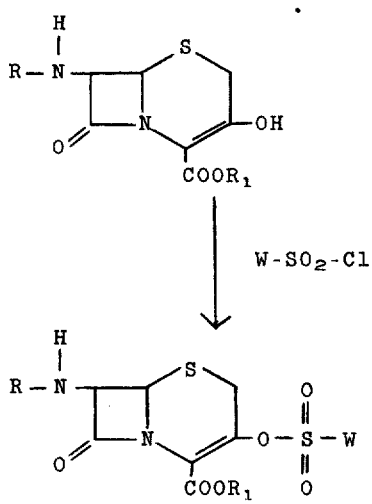

In the above formulae, the terms R and $R_1$ have the same meanings as previously defined and W is $C_1$-$C_6$ lower alkyl, such as methyl, ethyl, propyl, n-butyl, n-hexyl, and the like, or W is a phenyl group or a substituted phenyl group such as methylphenyl, nitrophenyl, or halophenyl. Representative of the sulfonyl halides which can be employed in the preparation of these sulfonate esters are methanesulfonyl chloride, toluenesulfonyl chloride, p-fluorobenzene sulfonyl chloride, ethanesulfonyl chloride, butanesulfonyl chloride, and the like.

The reaction is carried out in an inert solvent at a temperature between about −5° and 35° C., and preferably between about 15° and 25° C. Inert solvents which can be employed in the sulfonation reaction are solvents which are unreactive with the sulfonyl halide generally aprotic solvents. Solvents which can be employed include amides such as N,N-dimethylformamide and N,N-dimethylacetamide, and ethers such as tetrahydrofuran and dioxane. A preferred solvent for the sulfonation reaction is N,N-dimethylacetamide. The reaction is carried out in the presence of a hydrogen halide acceptor, for example, any of the commonly employed tertiary amines, such as pyridine and triethylamine; alkylene oxides also can be employed, with the most preferred hydrogen halide acceptor being propylene oxide. The tertiary amine hydrogen halide acceptors are less desirable than the alkylene oxides since the double bond in the $\Delta^3$ position of the cephem ring is susceptible to isomerization to the $\Delta^2$ position in the presence of these amines. However, should isomerization to the $\Delta^2$ isomer occur during sulfonate ester formation, the double bond can be isomerized back to the $\Delta^3$ position by oxidizing the $\Delta^2$ isomer of the sulfonate ester to the sulfoxide with a peracid, such as m-chloroperbenzoic acid or peracetic acid. During sulfoxide formation the double bond shifts from the $\Delta^2$ to the $\Delta^3$ position. The sulfoxide then can be reduced in accordance with well known methods, for example, with phosphorus trichloride, to provide the 3-cephem sulfonate ester.

For the purposes of the process of this invention, it doesn't matter whether the sulfonate ester starting material is the $\Delta^2$-isomer, the $\Delta^3$-isomer, or a mixture of the two. It has been discovered that, although the $\Delta^3$ isomer is the reactive species, the conditions under which the process of this invention are carried out are such that any $\Delta^2$ isomer which may be present in the starting material will be isomerized to the $\Delta^3$ species which then will react in accordance with the conditions of the process defined herein.

A preferred sulfonate ester for the conversion of the 3-hydroxy-3-cephem-4-carboxylic acid esters to the corresponding 3-fluoro-3-cephem compounds is the methylsulfonate ester (mesylate). Another preferred ester is that formed with p-toluenesulfonyl chloride (tosylate ester). A preferred $C_4$ carboxylic acid protecting ester group in the above described process is the p-nitrobenzyl ester.

In accordance with the process of this invention, the alkyl sulfonate or arylsulfonate esters of a 3-hydroxy-3-cephem ester can be converted to the corresponding 3-fluoro-3-cephem ester by the following general reaction scheme.

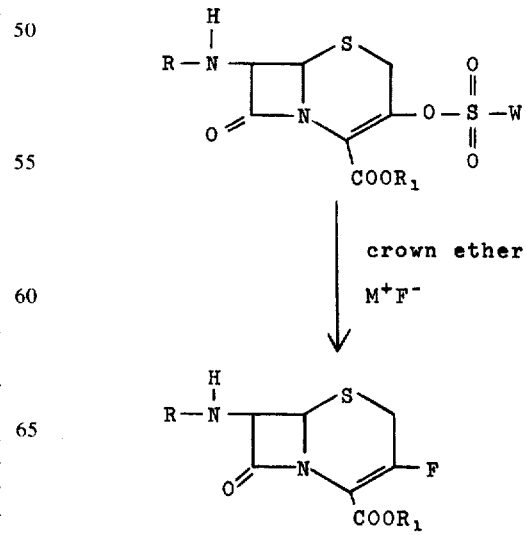

As indicated hereinabove, the sulfonate ester starting materials are defined as having in the 3-position the substituent

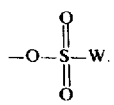

The substituent W, as used herein, defines $C_1$–$C_6$ lower alkyl, phenyl, tolyl, halophenyl, or nitrophenyl. Preferably, W is methyl, phenyl, or p-tolyl. Typical of the sulfonate ester groups thereby defined are methylsulfonyloxy, ethylsulfonyloxy, n-propylsulfonyloxy, isopropylsulfonyloxy, n-butylsulfonyloxy, isobutylsulfonyloxy, t-butylsulfonyloxy, n-amylsulfonyloxy, isoamylsulfonyloxy, t-amylsulfonyloxy, n-hexylsulfonyloxy, isohexylsulfonyloxy, 2,2-dimethylbutylsulfonyloxy, 3,3-dimethylbutylsulfonyloxy, 2,3-dimethylbutylsulfonyloxy, 3-methylpentylsulfonyloxy, phenylsulfonyloxy, p-tolylsulfonyloxy, m-tolylsulfonyloxy, o-tolylsulfonyloxy, o-nitrophenylsulfonyloxy, m-nitrophenylsulfonyloxy, p-nitrophenylsulfonyloxy, p-chlorophenylsulfonyloxy, m-bromophenylsulfonyloxy, p-fluorophenylsulfonyloxy, o-chlorophenylsulfonyloxy, p-bromophenylsulfonyloxy, and the like.

Crown ethers are recognized in the literature, see for example, R. N. Greene, *Tetrahedron Letters*, No. 18 (1972) pp. 1793–1796. Crown ethers are cyclic structures comprised of a chain of alternating ethylene groups and oxygen atoms. In the process of this invention, an 18-crown-6 ether is employed. The basic unsubstituted 18-crown-6 ether structure is

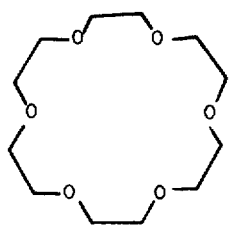

Alternatively, it is named 1,4,7,10,13,16-hexaoxacyclooctadecane. The common designation "18-crown-6" defines the total number of atoms in the ring (18) and the total number of oxygens (6) in the ring. Other 18-crown-6 ethers can be employed in the process of this invention. These include, for example, dibenzo-18-crown-6 having the formula

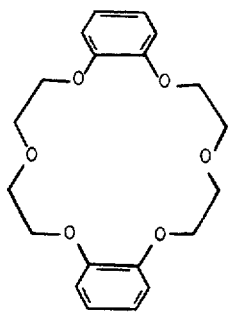

and dicyclohexyl-18-crown-6 having the formula

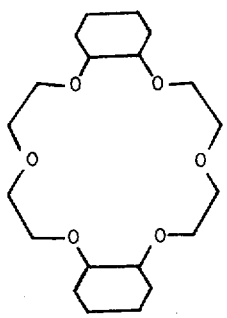

The source of fluorine for use in displacement of the sulfonate ester function is an inorganic fluoride of the formula $M^+F^-$ in which $M^+$ refers to a sodium, potassium or silver ion. Preferably, the fluoride salt which is employed is potassium fluoride.

The conversion of the 3-sulfonyloxy-3-cephem to the 3-fluoro-3-cephem is carried out in an inert solvent, specifically a nitrile or a nitroalkane, preferably acetonitrile, propionnitrile, nitromethane, or nitroethane, and, most preferably, acetonitrile, under substantially anhydrous conditions at a temperature of from about −20° C. to about +25° C., and, preferably, from about +15° C. to about +25° C. The 3-sulfonate ester cephalosporin present in the selected solvent is mixed with preferably, a maximum of one equivalent of the inorganic fluoride salt based on the sulfonate ester. Preferably, an equivalent amount of the sulfonate ester and the fluoride salt are employed. The crown ether preferably should be present in the reaction mixture in an amount equivalent on a molar basis to the amount of fluoride salt which is present. An excess of the crown ether can be employed; however, the excess will serve no useful purpose and will constitute simply a waste of valuable reagent. The reaction mixture is maintained at reaction temperature for a period generally of from about 30 minutes to about 3 hours, total time generally being dependent upon the temperature of reaction.

The product which is obtained from the reaction will correspond structurally in every respect to the sulfonate ester starting material with the exception that the group —O—SO$_2$—W will have been displaced by a fluorine atom.

As mentioned hereinbefore, the initial 3-sulfonate ester cephalosporin reactant can be either a $\Delta^3$-cephalosporin, a $\Delta^2$-cephalosporin, or a mixture of the two. The active reactant is the $\Delta^3$-cephalosporin. However, under the conditions of reaction, any $\Delta^2$-cephalosporin which may be present is isomerized to the corresponding $\Delta^3$-cephalosporin, and thus the active reactant is formed in situ from any $\Delta^2$-cephalosporin which may be present initially in the reaction mixture.

Isolation of the resulting product can be accomplished employing generally recognized techniques. Preferably, the product is isolated by means of preparative thin layer chromatography employing customary procedures.

The 7-acylamido-3-fluoro-3-cephem-4-carboxylic acid esters (Formula I, R = R'—C=O)

produced by the process of this invention are useful as intermediates in the preparation of the free acid antibiotic forms of the compounds. Ester forming groups within the definition of $R_1$ are all known groups commonly employed to protect the $C_4$ carboxylic acid group of the cephalosporin molecule while reactions involving other groups in the molecule are performed. These ester forming groups are readily removed to provide the free acid by known reduction or hydrolysis procedures. For example, the p-nitrobenzyl ester group is removed via catalytic hydrogenolysis over palladium on carbon (U.S. Pat. No. 3,632,850); the diphenylmethyl group (benzhydryl) is removed with trifluoroacetic acid in anisole at about 10° C.; the p-methoxybenzyl group is removed with trifluoroacetic acid at about 10° C. [*J. Org. Chem.*, 36, 1259 (1971)]; the 2,2,2-trichloroethyl group is removed with zinc and acid [*J. Am. Chem. Soc.*, 88, 852 (1966)]; the benzyl ester group is removed via catalytic hydrogenolysis over palladium catalyst [U.S. Pat. No. 3,197,466, *J. Org. Chem.*, 27, 1381 (1962)]; and the tertbutyl group is removed as described in *J. Org. Chem.*, 31, 444 (1966).

The following examples are provided to further illustrate the process of this invention.

EXAMPLE 1 p-Nitrobenzyl 7-[2-(2-thienyl)acetamido]-3-methylsulfonyloxy-3-cephem-4-carboxylate To a solution of 4.75 g. (10 mmole) of p-nitrobenzyl 7-[2-(2-thienyl)acetamido]-3-hydroxy-3-cephem-4-carboxylate in 50 ml. of dry N,N-dimethylacetamide were added 2 ml. of propylene oxide. To the solution was added with stirring one equivalent of methanesulfonyl chloride, and stirring was continued for 3 hours. The reaction mixture was then taken up in ethyl acetate, and the solution was washed with a saturated solution of sodium chloride. The washed organic phase was evaporated in vacuo to dryness to obtain the reaction product mixture was a residue. The reaction product was purified by preparative thin layer chromatography on silica gel using for elution 65 percent ethyl acetate/hexane.

The purified product gave the following percent elemental composition on microanalysis.

Calculated for $C_{21}H_{19}N_3O_9S_3$: Theory: C, 45.56; H, 3.46; N, 7.59; S, 17.38. Found: C, 45.74; H, 3.56; N, 7.30; S, 17.06.

The nuclear magnetic resonance spectrum and the infrared absorption spectrum were in agreement with the structure of the title compound.

EXAMPLE 2 p-Nitrobenzyl 7-[2-(2-thienyl)acetamido]-3-fluoro-3-cephem-4-carboxylate

To 93 mg. of dicyclohexyl-18-crown-6 ether in 15 ml. of acetonitrile (dried over molecular sieves) were added 25 mg. of potassium fluoride which had been dried in vacuo at 90° C. The mixture was stirred for 10 minutes, and 138 mg. of p-nitrobenzyl 7-[2-(2-thienyl-)acetamido]-3-methylsulfonyloxy-3-cephem-4-carboxylate in 4 ml. of acetonitrile were then added. The mixture was stirred for 1 hour. The mixture was acidified by addition of dilute (5%) HCl, and the resulting acidified mixture was extracted with ethyl acetate. Pure product was obtained from the ethyl acetate extract by preparative thin layer chromatography on silica gel using ethyl acetate:benzene (1:1). Ten mg. of p-nitrobenzyl 7-[2-(2-thienyl)acetamido]-3-fluoro-3-cephem-4-carboxylate were obtained.

I.R.: absorption peaks at 1792, 1740, and 1685 cm.$^{-1}$
NMR (CDCl$_3$) showed signals at 6.15 (s, $_2$H, $\alpha$ CH$_2$), 4.97 (d, 1H, J = 4 Hz, C$_6$-H), 4.20 (q, 1H, C$_7$-H), 3.52 (d, 1H, C$_7$-NH), 2.32 – 1.7 (m, 2H, C$_2$-H$_2$) tau.
Fluorine NMR — (d, J = 10 Hz).
M.S.: Calculated: 477.0465. Found: 477.0455.

Fragment 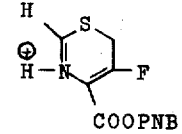

Calculated: 297.0345. Found: 297.0344.

EXAMPLE 3

7-[2-(2-Thienyl)acetamido]-3-fluoro-3-cephem-4-carboxylic acid

To 110 ml. of methanol and 83 mg. of pre-reduced 5 percent palladium on carbon were added 83 mg. of p-nitrobenzyl 7-[2-(2-thienyl)acetamido]-3-fluoro-3-cephem-4-carboxylate. The mixture was hydrogenated at 53 psig. for 1 hour. The resulting mixture was filtered, the filtered catalyst was washed with methanol, and the methanol washings were added to the filtrate. The filtrate was then evaporated in vacuo. The residue was dissolved in ethyl acetate, and the ethyl acetate solution was extracted with dilute aqueous sodium bicarbonate. The sodium bicarbonate solution was washed with ethyl acetate, layered with ethyl acetate, and dilute aqueous HCl was added. The layered ethyl acetate was separated and evaporated to recover 7-[2-(2-thienyl)acetamido]-3-fluoro-3-cephem-4-carboxylic acid, shown by bioautogram to be biologically active.

I claim:

1. A process for preparing a compound of the formula

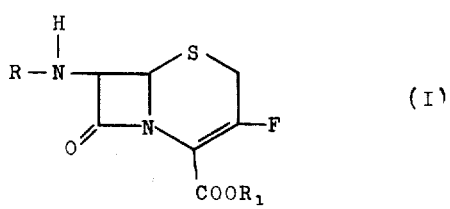

which comprises the step of reacting under substantially anhydrous conditions a 3-sulfonate ester cephalosporin of the formula

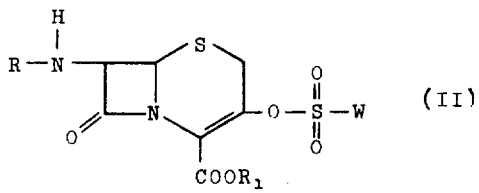

with an inorganic fluoride of the formula $M^+F^-$ in which M is potassium, sodium, or silver in the presence of an 18-crown-6 ether and an inert solvent selected from the group consisting of a nitrile and a nitroalkane at a temperature of from about $-20°$ C. to about $+25°$ C., in which, in the above formulae, W is $C_1-C_6$ alkyl, phenyl, tolyl, halophenyl, or nitrophenyl, R is an acyl group derived from a carboxylic acid and represented by the formula

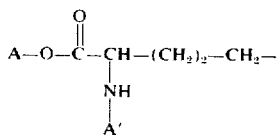

wherein,
R' is $C_1-C_6$ alkyl, $C_1-C_3$ haloalkyl, $C_1-C_3$ cyanoalkyl, phenyl, methylphenyl, hydroxyphenyl, halophenyl, nitrophenyl, methoxyphenyl, or a 5-substituted-amino-5-carboxybutyl ester group of the formula

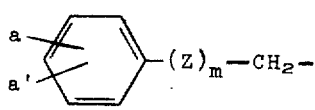

wherein,
A is diphenylmethyl, p-nitrobenzyl, benzyl, 2,2,2-trichloroethyl, t-butyl, or p-methoxybenzyl and A' is $C_2-C_4$ alkanoyl, $C_2-C_4$ haloalkanoyl, benzoyl, halobenzoyl, 2,4-dinitrophenyl, or phthaloyl;
or R' is a group of the formula

wherein,
$a$ and $a'$ independently are hydrogen, $C_1-C_4$ lower alkyl, $C_1-C_4$ lower alkoxy, halogen, hydroxy, or nitro;
Z is O or S; and
$m$ is 0 or 1;
or R' is a group of the formula

wherein
P is 2-thienyl, 3-thienyl, or a phenyl group of the formula

wherein
$a$ and $a'$ are as defined above, Q is hydroxyl, formyloxy, acetoxy, or protected amino;
or R' is a group of the formula
wherein
R'' is 2-thienyl, 3-thienyl, 2-furyl, 2-oxazyl, 2-thiazyl, or 1-tetrazyl; and
$R_1$ is benzyl, p-methoxybenzyl, p-nitrobenzyl, diphenylmethyl, 2,2,2-trichloroethyl, or t-butyl.

2. Process of claim 1, in which the 18-crown-6 ether is unsubstituted, dibenzo-substituted, or dicyclohexyl-substituted.

3. Process of claim 2, in which the 18-crown-6 ether is dicyclohexyl-18-crown-6 ether.

4. Process of claim 1, in which the inorganic fluoride is potassium fluoride.

5. Process of claim 1, in which equivalent amounts of the sulfonate ester cephalosporin and the inorganic fluoride are employed.

6. Process of claim 1, in which the crown ether and the inorganic fluoride are employed in molar equivalent amounts.

7. Process of claim 1, in which the reaction is carried out at a temperature of from about $+15°$ C. to about $+25°$ C.

8. Process of claim 1, in which the inert solvent is a nitrile or a nitroalkane.

9. Process of claim 8, in which the solvent is acetonitrile.

10. Process of claim 1, in which W is of the 3-sulfonyloxy group of the 3-sulfonate ester cephalosporin is methyl, phenyl, or p-tolyl.

11. Process of claim 1, in which $R_1$ is p-nitrobenzyl.

* * * * *